United States Patent Office 3,133,928
Patented May 19, 1964

3,133,928
METHOD FOR PREPARING 1,3,3-TRISUBSTITUTED - 1,2,3,4 - TETRAHYDROQUINOLINE-2,4-DIONES
Leslie Frederick Wiggins, Wargrave, John William James, Langley, and Richard William Temple, Marlow, England, assignors to Aspro-Nicholas Limited, Slough, England, a British company
No Drawing. Filed Dec. 28, 1960, Ser. No. 78,805
Claims priority, application Great Britain Dec. 31, 1959
4 Claims. (Cl. 260—289)

This invention relates to new quinoline derivatives and to a process for the preparation thereof.

According to one aspect of the invention, there are provided new quinoline derivatives represented by the structural formula

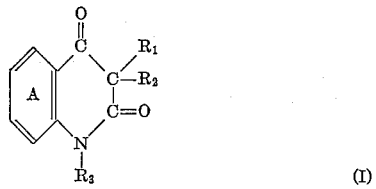

(I)

wherein $R_1$ is a straight or branched chain saturated alkyl group containing from 1 to 5 carbon atoms, a cycloalkyl group containing 5 or 6 carbon atoms, an unsubstituted or substituted aryl group, or an araklkyl group, $R_2$ is a straight or branched chain saturated or unsaturated alkyl group containing from 1 to 5 carbon atoms, or an aralklyl group, $R_3$ is a straight or branched chain saturated or unsaturated alkyl group containing from 1 to 4 carbon atoms, or an aralkyl group, and the benzene ring A is optionally substituted in the 6, 7 or 8 position by a halogen atom, for example chlorine, a lower alkyl group which may be substituted, for example by a trifluoromethyl group, or a lower alkoxy group.

According to another aspect of the invention, there is provided a process for preparing the quinoline derivatives represented by the structural Formula I above, which process comprises converting a N-substituted-3-monosubstituted tetrahydroquinoline-2:4-dione represented by the structural formula:

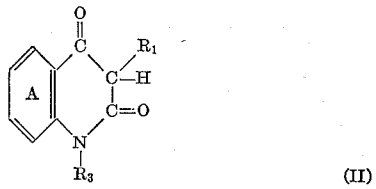

(II)

wherein $R_1$ and $R_3$ have the meanings defined above, into the corresponding alkali metal salt, preferably the sodium salt, in a lower alkanol, such as for example ethanol or methanol, using an alkali metal alkoxide, and thereafter reacting the resulting alkali metal salt at an elevated temperature with a compound of the general formula $R_2X$ wherein X is a chlorine, bromine or iodine atom and $R_2$ has the meaning defined above, to form the desired quinoline derivative.

The product may be worked up by removal of the solvent and addition of a dilute alkali (e.g. NaOH) which forms a salt with any unchanged starting material and allows the product to be extracted using an organic solvent such as for example, ether or chloroform. The solution may then be dried, the solvent removed and the product recrystallised from a suitable solvent or mixture of solvents.

The new quinoline derivatives of the invention possess varied useful pharmacological properties. In particular, these compounds have been found to have tranquillising activity. In addition, some of the compounds have been found to possess analgesic activity when compared with morphine, whilst some of the compounds have considerable bacteriostatic or bacteriocidal action.

The invention is illustrated by the following examples.

Example 1

1-methyl-3-phenyl - 1:2:3:4 - tetrahydroquinoline-2:4-dione (25 g.) was dissolved in a solution of sodium ethoxide in dry ethanol made from sodium (2.5 g.) and dry ethanol (100 mls.). Ethyl iodide (17 g.) was added to the resulting clear yellow solution which was then refluxed with stirring for eight hours. The solvent was distilled off, finally under vacuum, and chloroform (100 mls.) and 5% aqueous sodium hydroxide solution (30 mls.) added to the residue and shaken. The chloroform layer was separated and washed twice with 30 ml. portions of 5% aqueous sodium hydroxide solution then twice with water, and then dried with magnesium sulphate. The drying agent was filtered off and the chloroform solution was shaken with animal charcoal to decolourise it. The charcoal was filtered off and the chloroform was distilled, leaving 3-ethyl-1-methyl-3-phenyl-1:2:3:4-tetrahydroquinoline-2:4-dione, which was crystallised from petroleum ether (B.P. 60–80° C.). The melting point was 106–108° C.

The following table lists some 3-substituted-1-methyl-3-phenyl-1:2:3:4-tetrahydroquinoline - 2:4 - diones made from 1-methyl-3-phenyl-1:2:3:4-tetrahydroquinoline-2:4-dione and an alkyl, alkenyl or aryl halide in the manner described in Example 1. The reaction may be illustrated as follows:

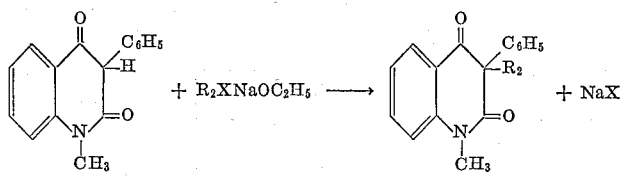

| $R_2X$ used | 1:3:3-trisubstituted-1:2:3:4-tetrahydroquinoline-3:4-dione | | | Melting pt. or boiling pt., ° C. | Solvents used for crystallisation |
|---|---|---|---|---|---|
| | $R_1$ | $R_2$ | $R_3$ | | |
| Methyl iodide | Phenyl | methyl | methyl | M.P. 125–126.5° | benzene pet. ether. |
| n-propyl bromide | do | n-propyl | do | m.p. 96–99° | Do. |
| iso-propyl bromide | do | iso-propyl | do | m.p. 134–136° | Do. |
| allyl bromide | do | allyl | do | M.P. 94–96° | pet. ether. |
| n-butyl bromide | do | n-butyl | do | M.P. 66–68° | Do. |
| n-amyl bromide | do | n-amyl | do | B.P. 188–192°/0.1 mm. | |
| sec. amyl bromide | do | sec. amyl | do | B.P. 206°/0.5 mm | |
| benzyl chloride | do | benzyl | do | M.P. 163–164° | benzene pet. ether. |
| 2-phenyl ethyl bromide | do | 2'-phenyl ethyl | do | M.P. 90–91.5° | Do. |

Example 2

1-ethyl-3-phenyl - 1:2:3:4 -tetrahydroquinoline - 2:4-dione (16 g.) was dissolved in a solution of sodium ethoxide in ethanol prepared from sodium (1.3 g.) and dry ethanol (100 mls.). Ethyl iodide (15 g.) was added and the mixture heated under reflux with stirring for four hours. Ethanol (70 mls.) was distilled off and water (100 mls.) was added. The precipitated oil was extracted with ether and the ethereal solution was washed twice with 5% aqueous sodium hydroxide solution, then twice with water. After drying with magnesium sulphate, the ether was evaporated off and the residual 1:3-diethyl-3-phenyl-1:2:3:4-tetrahydroquinoline-2:4-dione was crystallised from a small amount of petroleum ether (B.P. 60–80° C.). The melting point was 93–95° C.

Example 3

1-isopropyl-3-phenyl - 1:2:3:4 - tetrahydroquinoline-2:4-dione (16 g.) was dissolved in dry alcohol (100 mls.) containing sodium (1.4 g.). Ethyl iodide (24 g.) was added and the mixture was refluxed for 6 hours. The solvent was distilled off and chloroform (100 mls.) and 5% aqueous sodium hydroxide were added and shaken. The chloroform layer was separated and washed twice with 5% sodium hydroxide solution and twice with water. After drying with magnesium sulphate the ether was distilled off and the residue was crystallised from petroleum ether (B.P. 60–80° C.) to give 3-ethyl-1-isopropyl-3-phenyl-1:2:3:4-tetrahydroquinoline-2:4-dione of melting point 108–110° C.

Example 4

N-ethylaniline (25 g.) and ethyldiethylmalonate (50 g.) were heated together in a flask equipped with a lagged fractionating column, the rate of heating being adjusted so that the ethanol formed in the reaction distilled off at the top of the column and was condensed and collected, while the reactants refluxed. When the reaction ceased 1:3-diethyl - 1:2:3:4 - tetrahydroquinoline-2:4-dione crystallised on cooling. It was recrystallised from aqueous ethanol. The melting point was 167–168.5° C.

The 1:3-diethyl-1:2:3:4-tetrahydroquinoline-2:4-dione (13.7 g.) was added to a solution of sodium ethoxide in ethanol made from sodium (1.6 g.) and ethanol (60 mls.). Ethyl iodide (20 g.) was added and the mixture was heated under reflux with stirring for six hours. The alcohol was distilled off and ether and 5% sodium hydroxide solution were added to the residue and shaken. The ether layer was separated and washed twice with 5% sodium hydroxide solution and twice with water. After drying with magnesium sulphate, the ether was distilled off and the residual 1:3:3-triethyl-1:2:3:4-tetrahydroquinoline-2:4-dione was distilled at 0.15 mm. pressure, as a light yellow oil of boiling point 130–134° C.

Example 5

3-ethyl-1-methyl-1:2:3:4-tetrahydroquinoline - 2:4-dione (38 g.) was added to dry ethanol (200 mls.) containing sodium (4.5 g.). Ethyl iodide (36 g.) was added to the solution and the mixture was heated under reflux for eighteen hours. The solvent was distilled off and ether and 5% sodium hydroxide solution were added to the residue and shaken. The ether layer was separated and washed twice with 5% sodium hydroxide solution and twice with water. After drying with magnesium sulphate the ether was distilled off and the residual 3:3-diethyl-1-methyl-1:2:3:4-tetrahydroquinoline-2:4-dione was crystallised from petroleum ether (B.P. 60–80° C.). The melting point was 74–75.5° C.

Example 6 n-Propylaniline (13.5 g.) and phenyldiethylmalonate (28 g.) were heated together in a flask equipped with a lagged fractionating column, the rate of heating being such that the ethanol formed in the reaction distilled off at the top of the column and was condensed and collected while the reactants refluxed. After 11 mls. of ethanol had been collected the reaction mixture was cooled and crystallised from methanol to give 3-phenyl-1-n-propyl-1:2:3:4-tetrahydroquinoline-2:4-dione of melting point 203–204° C.

The 3-phenyl-1-n-propyl-1:2:3:4-tetrahydroquinoline-2:4-dione (16 g.) was dissolved in dry ethanol (80 mls.) containing sodium (1.4 g.). Ethyl iodide (24 g.) was added and the mixture was refluxed for six hours. Most of the solvent was distilled off and chloroform (100 mls.) and 5% aqueous sodium hydroxide were added and shaken. The chloroform layer was separated and washed twice with 5% sodium hydroxide solution and twice with water, then dried over magnesium sulphate. The chloroform was distilled off and the 3-ethyl-3-phenyl-1-n-propyl-1:2:3:4-tetrahydroquinoline - 2:4 - dione remaining was crystallised from petroleum ether (B.P. 60–80° C.). The melting point was 96–98° C.

Example 7

N-n-butylaniline (22 g.) and phenyldiethylmalonate (42 g.) were heated together in a flask equipped with a lagged fractionating column, the rate of heating being such that the ethanol formed in the reaction distilled off at the top of the column and was condensed while the reactants refluxed. When reaction ceased the reaction mixture was cooled and crystallised from ethanol to give 1-n-butyl-3-phenyl-1:2:3:4-tetrahydroquinoline-2:4-dione of melting point 183.5–184.5° C.

The 1-n-butyl-3-phenyl - 1:2:3:4 - tetrahydroquinoline-2:4-dione (16 g.) was dissolvel in dry ethanol (100 mls.) containing sodium (1.4 g.). Ethyl iodide (20 g.) was added and the mixture was heated under reflux for five hours. Most of the solvent was distilled off and water (100 mls.) was added to the residue. The precipitated oil was extracted with ether and the extract was washed twice with 5% aqueous sodium hydroxide solution then twice with water. After drying with magnesium sulphate the ether was evaporated off and the residual 1-n-butyl-3-ethyl-3-phenyl - 1:2:3:4 - tetrahydroquinoline-2:4-dione was crystallised from petroleum ether (B.P. 40–60° C.). The melting point was 69–71° C.

Example 8 n-Amyl diethylmalonate (34 g.) and N-methylaniline (14 g.) were heated together in a flask equipped with a lagged fractionating column, the rate of heating being such that the ethanol formed in the reaction distilled at the top of the column and was condensed and collected, while the reactants refluxed. When 14.5 mls. of ethanol had been collected the reaction mixture was cooled. The resultant gum was dissolved in excess 10% sodium hydroxide solution and the sodium hydroxide solution was washed three times with ether, then made just acid with concentrated hydrochloric acid. The precipitated oil solidified on standing and was collected and washed with water and dried in a vacuum at 60° C., then crystallised from a mixture of benzene and petroleum ether (B.P. 60–80° C.) to give 3-n-amyl-1-methyl-1:2:3:4-tetrahydroquinoline-2:4-dione of melting point 127–129.5° C.

The 3-n-amyl-1-methyl-1:2:3:4 - tetrahydroquinoline-2:4-dione (15 g.) was dissolved in dry ethanol (100 mls.) containing sodium (1.5 g.). Ethyl iodide (15 g.) was added and the mixture was heated under reflux for eighteen hours. Most of the ethanol was distilled off and water (100 mls.) was added. The precipitated oil was extracted with ether. The ethereal extract was washed twice with 5% aqueous sodium hydroxide solution and twice with water and dried with magnesium sulphate. The ether was evaporated off and the residual oil was distilled at 0.1 mm. to give 3-n-amyl-3-ethyl-1-methyl-1:2:3:4-tetrahydroquinoline-2:4-dione, B.P. 156–160° C., $n_D^{22.5}$ 1.5650.

Example 9

N-benzylaniline (27 g.) and phenyldiethylmalonate (45 g.) were heated together in a flask with a lagged fractionating column, the rate of heating being such that the ethanol formed in the reaction distilled at the top of the column and was condensed and collected while the reactants refluxed. After 16.5 mls. of ethanol had been collected the reaction mixture was cooled. The crystalline mass was broken up with ethanol and collected and dried to give 1-benzyl-3-phenyl-1:2:3:4-tetrahydroquinoline-2:4-dione of melting point 256–258° C. Crystallisation from glacial acetic acid did not raise the melting point.

The 1-benzyl-3-phenyl - 1:2:3:4 - tetrahydroquinoline-2:4-dione (20.4 g.) was dissolved in dry methanol (100 mls.) containing sodium (1.5 g.). Ethyl iodide (20 g.) was added and the mixture was heated under reflux for six hours. Most of the solvent was evaporated off and ether (200 mls.) and 5% aqueous sodium hydroxide solution were added and shaken. The ether layer was separated and washed once more with 5% sodium hydroxide solution, then three times with water. The ethereal solution was dried with magnesium sulphate, then the ether was distilled off, leaving 1-benzyl-3-ethyl-3-phenyl-1:2:3:4-tetrahydroquinoline-2:4-dione as a crystalline solid, M.P. 107–109° C. The melting point was raised to 108–110° C. by crystallisation from a mixture of benzene and petroleum ether (B.P. 60–80° C.).

Example 10

7 - chloro-1-methyl-3-phenyl-1:2:3:4-tetrahydroquinoline-2:4-dione (28 g.) was added to dry ethanol (180 mls.) containing sodium (2.5 g.) and the mixture was heated under reflux until the tetrahydroquinoline went into solution. Ethyl iodide (32 g.) was added and refluxing was continued for eight hours. Most of the solvent was distilled off and chloroform (150 mls.) and 5% sodium hydroxide were added to the residue and shaken. The chloroform layer was separated and washed three times with 5% sodium hydroxide solution and three times with water. After drying over magnesium sulphate, the chloroform solution was shaken with animal charcoal and filtered. The chloroform was distilled off and the remaining 7 - chloro - 3 - ethyl-1-methyl-3-phenyl-1:2:3:4 - tetrahydroquinoline-2:4 - dione was crystallised from ethanol. The melting point was 135–137° C.

Example 11

N-ethyl-m-chloroaniline (12 g.) and phenyldiethylmalonate (23 g.) were heated together in a flask equipped with a lagged fractionating column, the rate of heating being such that the ethanol formed in the reaction distilled at the top of the column and was condensed and collected while the reactants refluxed. After 9 mls. of ethanol had been collected the contents of the flask were cooled. The resulting black solid was dissolved in ethanol (400 mls.) and boiled with animal charcoal for a few minutes, then filtered. More charcoal was added and the process was repeated. The ethanol was evaporated down to 150 mls. and cooled. 7-chloro-1-ethyl-3-phenyl-1:2:3:4 - tetrahydroquinoline-2:4-dione crystallised out and was collected and dried. The melting point was 198–200° C. after sintering at 187° C. The material was dissolved in ethanol (300 mls.), heated with charcoal again, filtered, and evaporated down to 100 mls. and cooled. The tetrahydroquinoline dione was collected and dried. The melting point was 198–200° C.

The 7-chloro-1-ethyl-3-phenyl-1:2:3:4-tetrahydroquinoline-2:4-dione (15 g.) was added to dry ethanol (100 mls.) containing sodium (1.2 g.) and the mixture was heated under reflux until the tetrahydroquinoline-2:4-dione went into solution. Ethyl iodide (15 g.) was added and refluxing was continued for fifteen hours. The solvent was distilled off and chloroform and 5% aqueous sodium hydroxide were added to the residue and shaken. The chloroform layer was separated and washed three times with 5% sodium hydroxide solution and three times with water, then dried over magnesium sulphate. The chloroform was evaporated off and the 7-chloro-1:3-diethyl-3-phenyl-1:2:3:4-tetrahydroquinoline - 2:4 - dione which remained was crystallised from ethanol. The melting point was 167–169° C.

Example 12

1-ethyl-7-methyl-3-phenyl-1:2:3:4-tetrahydroquinoline-2:4-dione (22 g.) was added to dry ethanol (100 mls.) containing sodium (2.0 g.) and heated under reflux while ethyl iodide (12 mls.) was added. Refluxing was continued for seven hours, then most of the alcohol was distilled off and the residue was dissolved in chloroform and the chloroform solution was washed four times with 100 ml. portions of N sodium hydroxide solution and three times with water. After drying with magnesium sulphate the chloroform was distilled off and the residual solid was crystallised from ethanol to give 1:3-diethyl-7-methyl-3-phenyl-1:2:3:4 - tetrahydroquinoline-2:4-dione with melting point 184–186° C.

Example 13

3-ethyl-1-methyl-1:2:3:4-tetrahydroquinoline-2:4-dione (22.3 g.) was added to dry ethanol (100 mls.) containing sodium (2.7 g.). The solution was stirred and heated under reflux while benzyl chloride (16 g.) was added over ten minutes. After refluxing for two hours, the alcohol was distilled off and the residue was dissolved in chloroform. The chloroform solution was washed three times with N sodium hydroxide solution and three times with water, then dried with magnesium sulphite. The solvent was distilled off and the residual oil was distilled at 0.4 mm. pressure to give 3-benzyl-3-ethyl-1-methyl-1:2:3:4-tetrahydroquinoline-2:4-dione, B.P. 162–164° C., as an oil which crystallised on standing to give melting point 58–60° C.

Example 14

3-ethyl-1-methyl-1:2:3:4-tetrahydroquinoline-2:4-dione (20.5 g.) was added to dry ethanol (100 mls.) containing sodium (2.4 g.) and heated under reflux while allyl bromide (24 g.) was added over ten minutes. Refluxing was continued for one hour, the alcohol and excess allyl bromide was distilled off and the residual oil was taken up in chloroform and washed with aqueous N sodium hydroxide and then twice with water. After drying with magnesium sulphate, the solvent was distilled off and the residual oil was distilled at 0.1 mm. pressure to give 3-allyl-3-ethyl-1-methyl-1:2:3:4-tetrahydroquinoline-2:4-dione, B.P. 124–6° C.

Example 15

1:3 - diethyl - 1:2:3:4 - tetrahydroquinoline-2:4-dione (16.7 g.) in ethanol (100 mls.) containing sodium (2.0 g.) was reacted with allyl bromide (18 g.) in the manner described in Example 14, to give 3-allyl-1:3-diethyl-1:2:3:4-tetrahydroquinoline-2:4-dione, B.P. 118–119° C. at 0.1 mm. pressure.

Example 16

To a solution of sodium ethoxide in ethanol made from 1.5 g. sodium and 150 mls. of ethanol, 1-methyl-3-phenyl-7-trifluoromethyl-1:2:3:4 - tetrahydroquinoline-2:4-dione (20 g.) was added. The mixture was refluxed until all the solid dissolved then ethyl iodide (12 g.) was added and the solution was refluxed for twenty-four hours. The solvent was distilled off and the residue was taken up in chloroform and washed twice with N aqueous sodium hydroxide solution and twice with water. After shaking with charcoal and drying with magnesium sulphate, the chloroform was distilled off and the residual solid was recrystallised from petroleum ether (B.P. 60–80° C.) to give 3 - ethyl-1-methyl-3-phenyl-7-trifluoromethyl - 1:2:3:4 - tetrahydroquinoline - 2:4 - dione, melting point 125.5–127.5° C.

*Example 17*

3-cyclohexyl-1-methyl-1:2:3:4-tetrahydroquinoline-2:4-dione (15 g.) was added to a solution of sodium ethoxide in dry ethanol (from 1.4 g. sodium and 100 mls. ethanol) and the solution was heated under reflux while ethyl iodide (9.2 g.) was added. Refluxing was continued for twenty hours, then the ethanol was distilled off and the residue was taken up in chloroform and washed with dilute sodium hydroxide solution followed by washing with water and drying with magnesium sulphate. The chloroform was distilled off and the resulting solid was recrystallised from aqueous ethanol to give 3-cyclohexyl-3-ethyl-1-methyl-1:2:3:4-tetrahydroquinoline - 2:4 - dione with melting point 138–139° C.

We claim:
1. A process for preparing a quinoline compound having the formula:

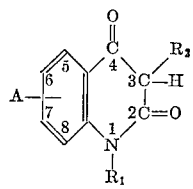

wherein $R_1$ is selected from the group consisting of aliphatic hydrocarbon radicals having from one to four carbon atoms, and benzyl; $R_2$ is selected from the group consisting of alkyl having from one to five carbon atoms, cycloalkyl having from five to six ring carbon atoms, phenyl and benzyl; $R_3$ is selected from the group consisting of aliphatic hydrocarbon radicals having from one to five carbon atoms, and benzyl; and A is a radical selected from the group consisting of hydrogen, halogen, trifluoromethyl, lower alkyl and lower alkoxy in a position selected from the group consisting of the 6-, 7- and 8-positions; which comprises reacting an alkali metal salt of a quinoline compound having the formula:

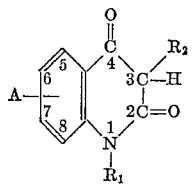

with a compound of the general formula $R_3X$, wherein X is selected from the group consisting of chlorine, bromine and iodine.

2. A process in accordance with claim 1 which comprises forming said alkali metal salt by reacting an alkali metal lower alkoxide with a compound of the formula

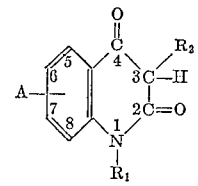

wherein $R_1$ and $R_2$ are as in claim 1.

3. A process as claimed in claim 2 wherein said alkali metal lower alkoxide is a solution of an alkali metal in a lower alkanol.

4. A process as claimed in claim 3 wherein said salt is in solution in said solvent and said salt and compound are reacted at reflux temperature.

References Cited in the file of this patent
UNITED STATES PATENTS

| | | |
|---|---|---|
| 2,819,272 | Den Hollander | Jan. 7, 1958 |
| 2,846,435 | Harris | Aug. 5, 1958 |
| 2,955,073 | Beer | Oct. 4, 1960 |
| 3,010,873 | Cavallini et al. | Nov. 28, 1961 |

FOREIGN PATENTS

| | | |
|---|---|---|
| 512,720 | Germany | Nov. 14, 1930 |
| 490,274 | Germany | Feb. 3, 1930 |
| 205,502 | Austria | Oct. 10, 1954 |

OTHER REFERENCES

Chakravarti et al.: Journal Chemistry Society, page 3337 (1953).

Royals, Advanced Organic Chemistry, pages 73–74 and pages 597–598 (1954).

Bowman et al.: J. Chem. Soc. (London), 1959, pages 444–7.

Yale: J. Med. and Pharm. Chem., volume 1, No. 2 (1959), pages 121–133.

UNITED STATES PATENT OFFICE
CERTIFICATE OF CORRECTION

May 19, 1964

Patent No. 3,133,928

Leslie Frederick Wiggins et al.

It is hereby certified that error appears in the above numbered patent requiring correction and that the said Letters Patent should read as corrected below.

Column 7, lines 21 to 28, the formula should appear as shown below instead of as in the patent:

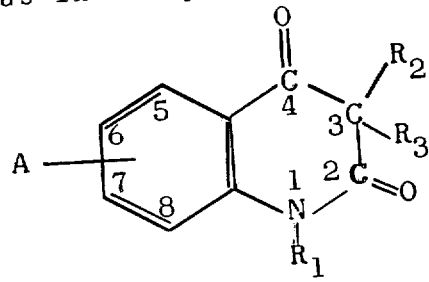

(SEAL)   Signed and sealed this 24th day of November 1964.

Attest:

ERNEST W. SWIDER
Attesting Officer

EDWARD J. BRENNER
Commissioner of Patents